United States Patent
Pounds

(10) Patent No.: US 12,504,463 B2
(45) Date of Patent: Dec. 23, 2025

(54) ELECTRICAL ISOLATION CIRCUITRY

(71) Applicant: Teradyne, Inc., North Reading, MA (US)

(72) Inventor: Douglas W. Pounds, Goffstown, NH (US)

(73) Assignee: Teradyne, Inc., North Reading, MA (US)

( * ) Notice: Subject to any disclaimer, the term of this patent is extended or adjusted under 35 U.S.C. 154(b) by 226 days.

(21) Appl. No.: 18/236,269

(22) Filed: Aug. 21, 2023

(65) Prior Publication Data

US 2025/0067796 A1 Feb. 27, 2025

(51) Int. Cl.
  *G01R 31/28* (2006.01)
(52) U.S. Cl.
  CPC .................. *G01R 31/2832* (2013.01)
(58) Field of Classification Search
  None
  See application file for complete search history.

(56) References Cited

U.S. PATENT DOCUMENTS

| | | | |
|---|---|---|---|
| 4,741,031 A | 4/1988 | Grandstaff | |
| 5,225,742 A | 7/1993 | Beasley | |
| 5,291,383 A | 3/1994 | Oughton | |
| 5,818,209 A | 10/1998 | Masini et al. | |
| 6,774,507 B1 | 8/2004 | Byers et al. | |
| 8,310,265 B2 * | 11/2012 | Zjajo | G01R 31/318558 |
| | | | 324/762.01 |
| 9,423,448 B1 | 8/2016 | Naiknaware | |
| 2007/0025123 A1 | 2/2007 | Kim et al. | |
| 2010/0127729 A1 * | 5/2010 | Zjajo | G01R 31/318558 |
| | | | 324/757.03 |

(Continued)

FOREIGN PATENT DOCUMENTS

| | | |
|---|---|---|
| KR | 10-2014-0115617 A | 10/2014 |
| KR | 10-2020-0071362 A | 6/2020 |

OTHER PUBLICATIONS

TechWeb, "Basic of Linear Regulators and Switching Regulators: Bootstrap Overview," [online] URL: https://techweb.rohm.com/product/power-ic/dcdc/dcdc-evaluation/829/, [downloaded on Sep. 25, 2023], (Feb. 15, 2016), 3 pages.

(Continued)

*Primary Examiner* — Jermele M Hollington
(74) *Attorney, Agent, or Firm* — ArentFox Schiff LLP

(57) ABSTRACT

Example circuitry is usable in testing a device under test (DUT). The circuitry includes test inputs; a resistor ladder including resistors electrically connected in series, with the resistor ladder being electrically connected to each of the test inputs; and first operational amplifiers, with each first operational amplifier including a first input and a first output, with each first input being electrically connected to the resistor ladder, and with each first output to electrically connect to the DUT. The circuitry includes floating circuitry which includes a second operational amplifier. The second operational amplifier includes a second input electrically connected to the resistor ladder and a reference input; a first power input to receive a first voltage; and a second power input to receive a second voltage. The floating circuitry is configured to apply the first voltage and the second voltage to power inputs of each of the first operational amplifiers.

21 Claims, 6 Drawing Sheets

(56) References Cited

U.S. PATENT DOCUMENTS

| | | |
|---|---|---|
| 2012/0013323 A1 | 1/2012 | Kenney |
| 2013/0134999 A1 | 5/2013 | Bartlett et al. |
| 2015/0268297 A1* | 9/2015 | Hsieh .................... G01R 27/28 330/2 |
| 2015/0301104 A1 | 10/2015 | Pounds et al. |
| 2016/0142049 A1 | 5/2016 | Richardson et al. |
| 2018/0059172 A1 | 3/2018 | Pounds |
| 2018/0167063 A1 | 6/2018 | Akahane |
| 2018/0219483 A1 | 8/2018 | Hsiao et al. |
| 2019/0013681 A1 | 1/2019 | De Breucker et al. |
| 2021/0167814 A1 | 6/2021 | Arduini et al. |
| 2021/0234534 A1 | 7/2021 | Rochford et al. |
| 2022/0255421 A1 | 8/2022 | Novakovic et al. |
| 2024/0337686 A1* | 10/2024 | Neema ............... G01R 31/2879 |

OTHER PUBLICATIONS

International Search Report and Written Opinion received for PCT Patent Application No. PCT/US2024/039131, mailed on Oct. 28, 2024, 11 pages.

* cited by examiner

ELECTRICAL ISOLATION CIRCUITRY

TECHNICAL FIELD

This specification describes example implementations of circuitry for electrically isolating, in whole or in part, a device under test (DUT) from one or more test system components.

BACKGROUND

A test system is configured to test the operation of a device. A device tested by the test system is referred to as a device under test (DUT). In some examples, the test system may include test instrumentation to send test signals, such as analog or digital signals and/or data, to the DUT for testing. The DUT replies with response signals. The test system expects the response signals to contain certain values and/or to have a certain timing, for example. If the response signals have the appropriate values and/or timing, the DUT passes testing. If the response signals do not have those values and/or timing, then the DUT may fail testing.

SUMMARY

Example circuitry is usable in testing a device under test (DUT). The circuitry includes test inputs; a resistor ladder including resistors electrically connected in series, with the resistor ladder being electrically connected to each of the test inputs; and first operational amplifiers, with each first operational amplifier including a first input and a first output, with each first input being electrically connected to the resistor ladder, and with each first output to electrically connect to the DUT. The circuitry includes floating circuitry which includes a second operational amplifier. The second operational amplifier includes a second input electrically connected to the resistor ladder and a reference input; a first power input to receive a first voltage; and a second power input to receive a second voltage. The first voltage and the second voltage are based on a voltage on the reference test input. The floating circuitry is configured to apply the first voltage and the second voltage to power inputs of each of the first operational amplifiers. The circuitry may include one or more of the following features, either alone or in combination.

The second operational amplifier may have a drift that is in a range of one microvolt (1 µV) or less. The second operational amplifier may have an offset that is in a range of ten microvolts (10 µV) or less. The first voltage and the second voltage may differ by a predefined amount irrespective of changes to the voltage on the reference test input. The first voltage and the second voltage may track the voltage on the reference test input. The second operational amplifier may include a second output The second input may have a greater impedance than the second output to at least partly electrically isolate the resistor ladder from the DUT.

The floating power supply may include a first transistor including a first output electrically connected to the first power input; and a second transistor including a second output electrically connected to the second power input. The first voltage may be a voltage at the first output and the second voltage may be a voltage at the second output. The first transistor may include a first input and a first control, and the second transistor may include a second input and a second control. The floating power supply may include: (i) a first current source and a first Zener diode, with the first Zener diode including a first cathode electrically connected to the first control and a first anode electrically connected to the op-amp output of the voltage follower operational amplifier, and with the first current source being electrically connected between the first input and the first control of the first transistor to provide current to bias the first Zener diode; and (ii) a second current source and a second Zener diode, with the second Zener diode including a second anode electrically connected to the second control and a second cathode electrically connected to the op-amp output of the voltage follower operational amplifier and to the first anode, and with the second current source being electrically connected between the second input and the second control of the second transistor to provide current to bias the second Zener diode. The first transistor may include a bipolar junction transistor having an NPN (Negative-Positive-Negative) configuration, and the second transistor comprises a bipolar junction transistor having a PNP (Positive-Negative-Positive) configuration. A voltage line may be connected to the first current source and controllable to apply voltage in excess of 200V to the first current source.

The circuitry may include diagnostic inputs to receive signals to test the resistor ladder. The resistor ladder network may be connected between the first operational amplifiers and diagnostic inputs such that a same resistor is electrically connected to each diagnostic input in a pair of adjacent diagnostic inputs and to each first operational amplifier in a corresponding pair of adjacent first operational amplifiers.

The circuitry may include parallel circuits, with each parallel circuit including one of the first operational amplifiers. The resistor ladder may be electrically connected to each of the parallel circuits. The voltage on the reference input may be controllable to change. The first voltage and the second voltage may continue to differ by the predefined amount following the change.

The circuitry may include a switch circuit at each op-amp output, with the switch circuit being controllable to apply a voltage from a corresponding first operational amplifier to a pin on the DUT. The DUT may include a battery management system.

An example testing system includes floating power supply modules connected in series, with each of the floating power supply modules also being connected to a device under test (DUT). Each floating power supply module includes test inputs; a resistor ladder comprising resistors electrically connected in series, with the resistor ladder being electrically connected to each of the test inputs; first operational amplifiers, with each first operational amplifier including a first input and a first output, with each first input being electrically connected to the resistor ladder, and with each first output to electrically connect to the DUT; and a floating circuit configured to at least partly electrically isolate the resistor ladder. The floating circuit includes a second operational amplifier which includes: a second input electrically connected to the resistor ladder and a reference input; a first power input to receive a first voltage; and a second power input to receive a second voltage. The first voltage and the second voltage may be based on a voltage on the reference test input, The floating circuit may be configured to apply the first voltage and the second voltage to power inputs of each of the first operational amplifiers.

The floating power supply modules may include a first floating power supply module that includes a first resistor ladder and a second floating power supply module that includes a second resistor ladder. Each of the first resistor ladder and the second resistor ladder may include a high voltage end corresponding to a first test input and a low voltage end corresponding to a second test input, with the high voltage end being at a greater voltage than the low voltage end. The high voltage end of the first resistor ladder may be electrically connected to the low voltage end of the second resistor ladder. In each floating power supply module, the floating circuit is configured to at least partly electrically isolate the resistor ladder from the DUT. Each floating power supply module may include circuit elements electrically connected to the second operational amplifier to produce the first voltage and the second voltage. Each floating power supply may include means for producing the first voltage and the second voltage.

The floating power supply modules may include a first floating power supply module including a first resistor ladder and multiple second floating power supply modules each including a respective second resistor ladder. Each of the first resistor ladder and each second resistor ladder may include a high voltage end corresponding to a first test input and a low voltage end corresponding to a second test input, with the high voltage end being at a greater voltage than the low voltage end. The high voltage end of the first resistor ladder may be electrically connected to the low voltage end of a second resistor ladder and, for each additional second resistor ladder, a low voltage end thereof may be electrically connected to a high voltage end of a preceding second resistor ladder.

Any two or more of the features described in this specification, including in this summary section, may be combined to form implementations not specifically described in this specification.

At least part of the devices, circuitry, systems, techniques, and processes described in this specification may be implemented or controlled by executing, on one or more processing devices, instructions that are stored on one or more non-transitory machine-readable storage media. Examples of non-transitory machine-readable storage media include read-only memory, an optical disk drive, memory disk drive, and random access memory. At least part of the devices, circuitry, systems, techniques, and processes described in this specification may be implemented or controlled using a computing system comprised of one or more processing devices and memory storing instructions that are executable by the one or more processing devices to perform various control operations. The devices, circuitry, systems, techniques, and processes described in this specification may be configured, for example, through design, construction, composition, arrangement, placement, programming, operation, activation, deactivation, and/or control.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

Figure 1:
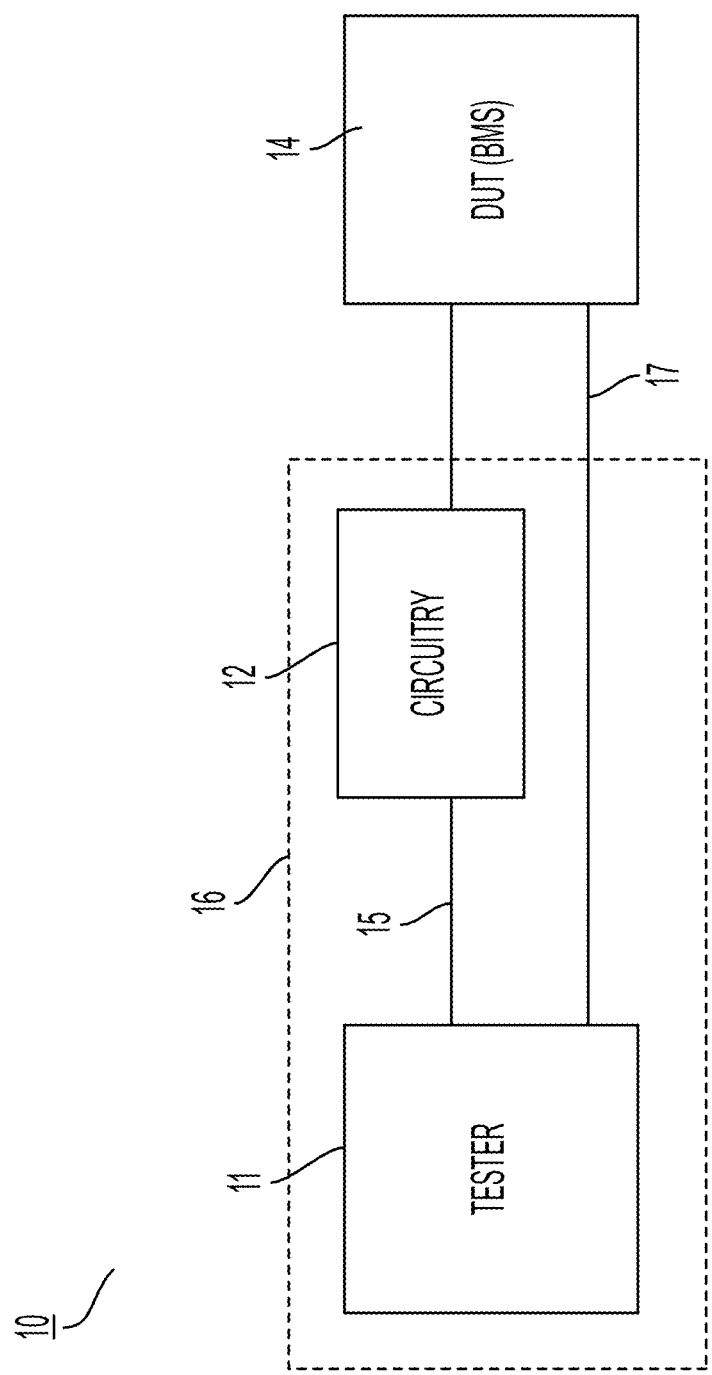
FIG. 1 is a block diagram of an example test setup.

Described herein are example implementations of circuitry for use in testing a device (the DUT). An example of a device that may be tested using the circuitry is a battery management system (BMS). An example BMS is configured to control testing of lithium ion (Li-ion) or other types of batteries. A BMS is described in the following example implementations; however, the circuitry may be used to test any type of device or system including, but not limited to, electronic devices and high-voltage devices/systems such as motors, generators, transformers, or medical imaging systems.

During testing, Li-ion batteries are arranged in a stack. Circuits that are part of the BMS are also arranged in a stack, with each such circuit for providing signals to a corresponding battery. To test the BMS circuits, a voltage is applied across a resistor ladder to each circuit in the stack and a response to the applied voltage is evaluated.

Connecting the BMS to the resistor ladder can affects the impedance of the resistor ladder, which can change the voltages applied to the BMS and, thereby, adversely affect testing the BMS. Accordingly, the circuitry described herein is configured to electrically isolate at least the resistor ladder, wholly or partly, from the BMS (the DUT in this example). In some implementations, this circuitry includes output operational amplifiers (op-amps), each of which includes an input that is high impedance electrically connected to the resistor ladder, and each of which includes an output that is low impedance and that faces the BMS. By using high-impedance inputs to connect to the resistor ladder, the resistor ladder is electrically isolated from the BMS, either wholly or at least partially, thereby limiting or preventing changes in impedance on the resistor ladder that can be caused by connection to the BMS. Other components of the test system, such as the test instruments, are also electrically isolated from the BMS, either wholly or at least partially. By using low-impedance outputs to connect to the BMS, impedance effects on the test signals output to the BMS may be limited.

The output op-amps may have high precision, as may be required in some testing applications, such as when testing a BMS. For example, the drifts and offset voltages of the output op-amps may be relatively low, which enable relatively precise voltages to be delivered to the BMS. Such high precision can be challenging to maintain in the presence of high voltages like those from the resistor ladder. More specifically, voltages from the resistor ladder can be in the range of tens to hundreds of volts. Op-amps that are powered with voltages of such magnitude typically cannot maintain high precision. Accordingly, the circuitry includes floating circuitry, which is also referred to as a floating power supply or a bootstrap power supply. The floating circuitry includes a reference op-amp and associated circuitry configured to supply power to the output op-amps.

The reference op-amp is electrically connected to a reference input on the resistor ladder and tracks the voltage at the reference input, which is why it is called "floating". The output of the reference op-amp is used to produce voltages to power the output op-amps. The voltages that power the other op-amps have a predefined difference that does not change outside of a predefined acceptable tolerance. The output op-amps can thus operate at a relatively low power or low power differential, thereby maintaining relatively high precision operation.

FIG. 1 shows an example test system setup 10 for testing test a DUT, such as a BMS. Test system setup 10 includes a tester 11, circuitry 12 like that described above, and a BMS 14 as the DUT. Tester 11 may include one or more test instruments (see, e.g., FIG. 5 and its accompanying description) configured to apply test signals, such as voltages, to circuitry 12 via one or more electrical pathways 15 and a control system (see, e.g., FIG. 5) to control operation of the test instruments and operation of circuitry 12. Circuitry 12 routes those test signals to BMS 14. Circuitry 12 may be integrated into tester 11 as indicated by dashed line 16 or separate from tester 11. Tester 11 may monitor a response of BMS 14 to the test signals via one or more electrical pathways 17 to determine whether BMS 14 has passed or failed testing.

Figure 2:
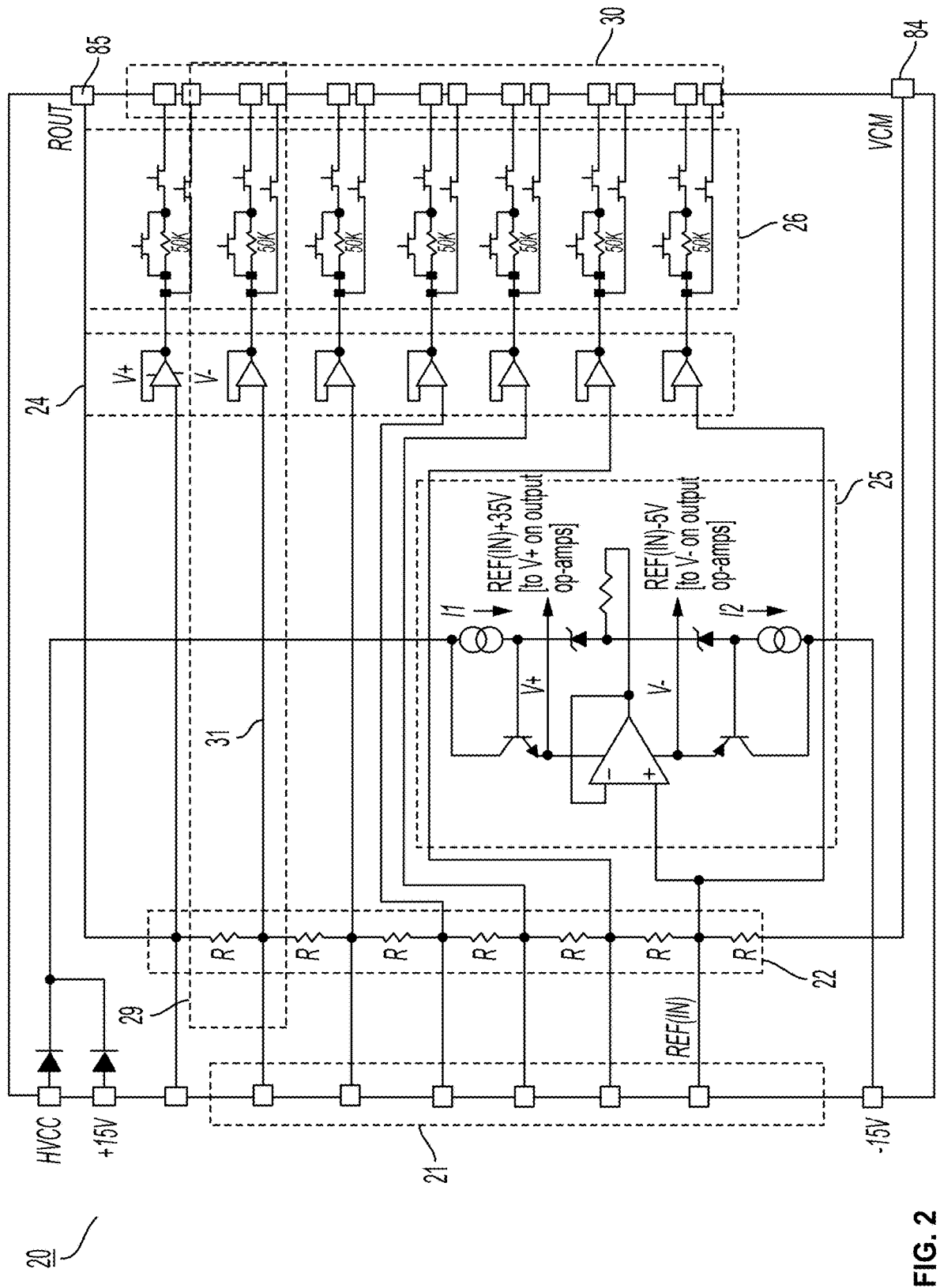
FIG. 2 is a diagram of example circuitry for electrically isolating, in whole or in part, a device under test (DUT) from one or more test system components.
Figure 3:
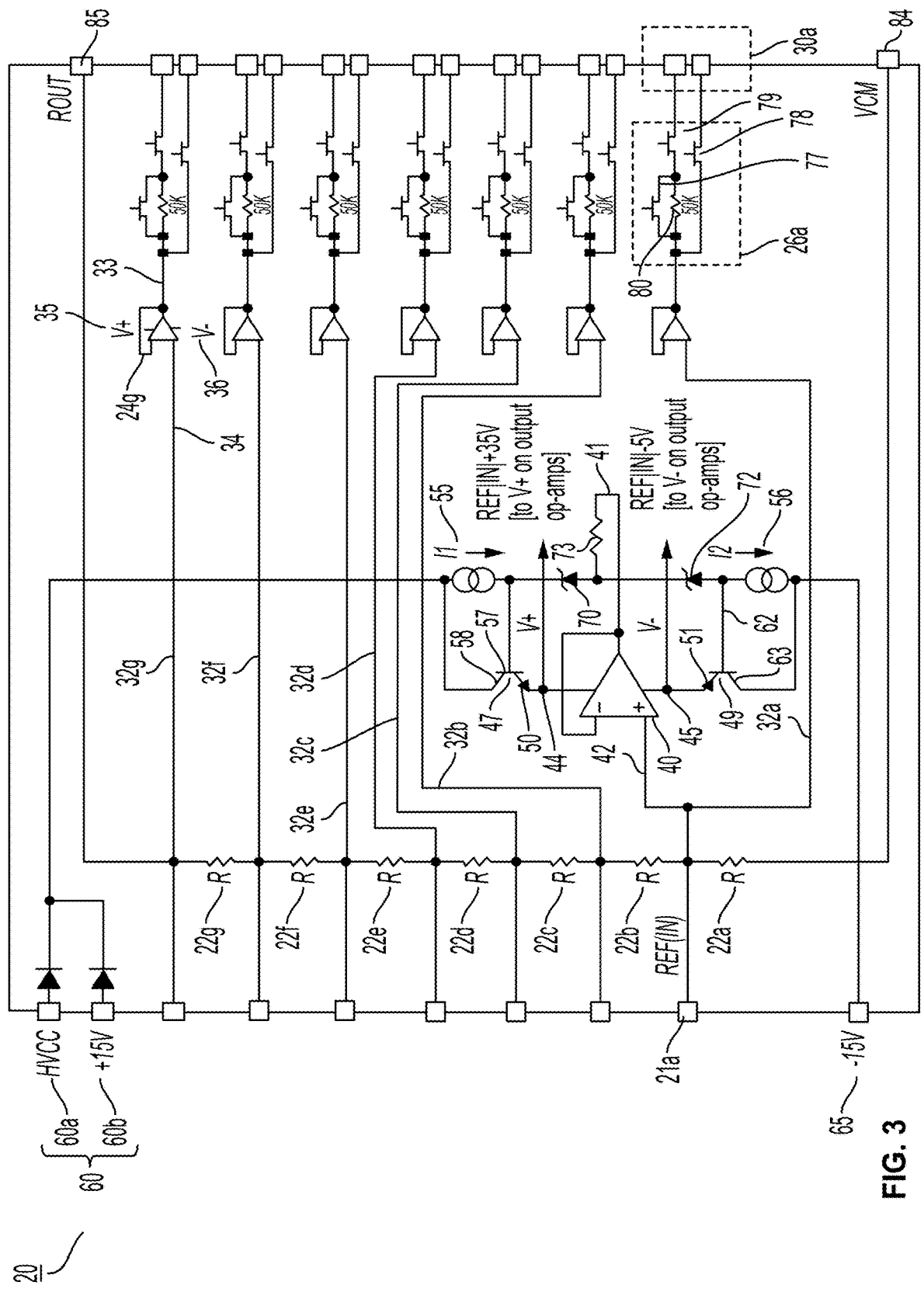
FIG. 3 is the same diagram as FIG. 2 with different annotations.

FIGS. 2 and 3 shows an example implementation 20 of circuitry 12. The same figure is provided twice due to the large number of reference numerals required to describe the figure. Referring to FIG. 2, example circuitry 20 includes diagnostic inputs 21 for receiving diagnostic signals to verify functionality of the resistor ladder—for example, that the resistor is not broken and that it is functioning correctly. Circuitry 20 also includes the resistor ladder 22 for providing voltage at each BMS test input based on voltages received at test inputs from voltage sources 84 and 85 described below, output op-amps 24 for electrical isolation, floating circuitry 25 for providing power to output op-amps 24, and switches 26 to provide signals output from output op-amps 24 based on the voltages from sources 84 and 85 to test a BMS, such as BMS 14.

Diagnostic inputs 21 electrically connect to the resistor ladder as shown in FIG. 1. Diagnostic inputs 21 may be electrically connected to instrumentation in the tester, such as one or more of the test instruments of FIG. 5 described below. Signals from tester are thus applied to diagnostic inputs 21 for testing the operation of the resistor ladder. The signals may be voltages but also may be currents or combinations of voltages and currents. The test signals may be analog or digital.

Circuitry 20 includes parallel circuits, such as circuit 29, over which the test signals pass through circuitry 20 to the BMS. In this example, the parallel circuits correspond to respective outputs 30 to the BMS; for example, one parallel circuit per output or set of outputs. The parallel circuits may include conductors to transport signals. In some implementations, the parallel circuits may include passive and/or active circuit elements (not shown) to change the electrical characteristics of the test signals. Examples of passive circuit elements include resistors and capacitors. Examples of active circuit elements include transistors, op-amps, and integrated circuits. In this example, each parallel circuit is in series with a diagnostic inputs 21 and includes a conductor such as conductor 31, an op-amp 24, a switch 26, and an output 30. Operation of op-amps 24 and switches 26 are described below.

Referring also to FIG. 3, as noted, circuitry 20 includes resistor ladder 22. In some implementations, resistor ladder 22 includes multiple resistors—in this example, seven resistors—electrically connected in series. The resistor ladder, however, is not limited to seven resistors; a resistor ladder may include more than seven resistors or fewer than seven resistors.

Resistor ladder 22 is electrically connected to, and across, each of the parallel circuits. In this example, each resistor ("R") 22a to 22g has an equal resistance and the resistor ladder 22 is electrically connected such that there is one resistor electrically connected between each pair of parallel circuits, as shown. For example, resistor 22b is electrically connected between parallel circuits 32a and 32b; resistor 22c is electrically connected between parallel circuits 32b and 32c; and so forth. In some implementations, there may be more than one resistor electrically connected between adjacent pairs of parallel circuits. In some implementations, the resistance of each resistor may be different than the resistance of one or more others of the resistors in the resistor ladder. In some implementations, the resistance electrically connected between one pair of parallel circuits may be different from the resistance electrically connected between another pair of parallel circuits.

As shown in FIGS. 2 and 3, each instance of circuitry 20 includes a low voltage end connected to a reference voltage source 84 and a high voltage end connected to a voltage source 85, with the high voltage end being at a greater voltage than the low voltage end. In this example, low voltage end voltage source 84 is a common mode voltage, labeled VCM and high voltage end voltage source 85 is labeled ROUT. The voltages applied to the resistor ladder correspond to—for example, are equal to or based on—the voltage difference between ROUT and VCM.

In the example configuration of FIGS. 2 and 3, resistor ladder 22 is configured to provide stepped voltage to each parallel circuit. For example, resistor 22a is configured to provide 5 volts (V) to parallel circuit 32a, which is the voltage produced by current through resistor 22a along resistor ladder 22; resistors 22a and 22b are configured to provide 10V to parallel circuit 32b, which is the voltage produced by current through resistors 22a and 22b along resistor ladder 22; resistors 22a, 22b, and 22c are configured to provide 15V to parallel circuit 32c, which is the voltage produced by current through resistors 22a, 22b, and 22c along resistor ladder 22; and so forth up to 35V provided to parallel circuit 32g. The 5V steps are examples of voltages that can be applied. Circuitry 20 can be configured to provide 10V steps, 15V steps, 20V steps and so forth. Any appropriate voltages or voltage step sizes may be used.

The signals used to test the BMS may correspond to signals applied to Li-ion batteries in arranged in a stack. For example, a signal applied by the BMS to an Li-ion battery in a stack may be in the range of 20V. The resistor ladder may therefore provide a corresponding test signal to a range of 20V.

Each parallel circuit 32a to 32g includes, and/or is electrically connected to, a respective output op-amp in a voltage follower configuration; in this example, one of op-amps 24. Each of op-amps 24 is electrically connected to a respective switch 26. In some implementations, each of op-amps 24 has an identical structure, function, and operational parameters. In some implementations, one or more of op-amps 24 may have a different structure or operational parameters from the others. Examples of operational parameters include, but are not limited to, drift and offset voltage.

Referring to op-amp 24g of FIG. 3 as an example, op-amp 24g is voltage follower, which is also known as a buffer amplifier. An example voltage follower is an op-amp circuit having the voltage at its output 33 equal to its the voltage at its input 34—that is, the output voltage "follows" the input voltage. Accordingly, ideally, a voltage follower op-amp does not amplify the input voltage and has a voltage gain of one.

Op-amps 24 each has (i) an input, such as input 34, that is high impedance and that is electrically connected to resistor ladder 22 and (ii) an output, such as output 33, that is low impedance, that is electrically connected to a corresponding switch 24, and that faces the BMS. In an example, the high impedance input of each op-amp 24 may be in the range of multiple millions to billions of ohms (Ω) or (more or less), for example. In an example, the low impedance output of each op-amp 24 may be 5Ω or less, 4Ω or less, 3Ω or less, 2Ω or less, or 1Ω or less, for example. The high impedance input electrically connected to the resistor ladder 22 electrically isolates, in whole or part, the resistor ladder (and other test components upstream of the resistor ladder) from the BMS, thereby inhibiting or preventing changes to impedance of the resistor ladder caused by connecting the BMS to circuitry 20.

The low impedance outputs of op-amps 24 support delivering relatively precise voltages to the DUT, as may be required for testing some types of DUTs. In some examples, voltage may be considered relatively precise if what is delivered deviates by 5% or less from what is expected, if what is delivered deviates by 3% or less from what is expected, if what is delivered deviates by 1% from what is expected, if what is delivered deviates by 0.05% or less from what is expected, if what is delivered deviates by 0.04% or less from what is expected, if what is delivered deviates by 0.03% or less from what is expected, if what is delivered deviates by 0.02% or less from what is expected, if what is delivered deviates by 0.01% or less from what is expected, and so forth.

In some implementations, the drifts and offset voltages of op-amps 24 may be relatively low, which enables the relatively precise voltages to be delivered to the BMS. In some implementations, each of op-amp 24 has the same drift and offset voltage. In some implementations, ones of op-amps 24 may have different drift and/or offset voltages than others of op-amps 24.

Regarding drift, op-amp drift may include variations in amplifier performance resulting from changes in environmental conditions, such as temperature or humidity. Regarding offset voltage, the DC voltage of the $V_{IN}(+)$ and $V_{IN}(-)$ terminals of an op-amp ideally match exactly when the input voltage to the op-amp is 0V. However, practically, there may be differences in input impedance and input bias current between the $V_{IN}(+)$ and $V_{IN}(-)$ terminals, causing a difference in these two voltages. This difference, which is called offset voltage, is multiplied by a gain, and appears as an output voltage deviation from an ideal output. Op-amps 24 have relatively low drifts, which may be in the range of 5 microvolts (μ), 3 μV or less, 1 μV or less, 0.5 μV or less, 0.4 μV or less, 0.3 μV or less, 0.2 μV or less, or 0.1 μV or less in some examples. Op-amps 24 have relatively low offset voltages, which may be in range of ten microvolts (10 μV) or less, 9 μV or less, 8 μV or less, 7 μV or less, 6 μV or less, or 5 μV or less in some examples. In implementations that do not require such high precision, op-amps 24 may be used having offset voltages that are greater than 10 μV and/or having drifts that are greater than 0.5 μV.

Relatively low drifts and offset voltages can be difficult to maintain if high voltages, like those on resistor ladder 22, are applied to the op-amp power inputs, e.g., V+ 35 and V− 36 for op-amp 24g. Accordingly, in implementations that include op-amps having relatively low drifts and offset voltages, op-amps 24 are not powered directly from voltages on the resistor ladder 22. Instead, circuitry 20 includes floating circuitry 25 (see also FIG. 2), which includes a reference op-amp 40 and associated components in this example, to power each of the op-amps 24. Reference op-amp 40 may be identical to each of op-amps 24 in some implementations or reference op-amp 40 may be a different sized op-amp and/or have different operational parameters, such as drift and offset voltages.

In the example of FIGS. 2 and 3, reference op-amp 40 is configured in a voltage follower configuration such that the voltage at its output 41 tracks the voltage at its input 42. In this regard, reference op-amp 40 is configured to receive an input voltage at $V_{IN}(+)$ from a reference input 21a (REF (IN)) electrically connected to resistor ladder 22. In this example, the voltage at reference input 21a is boosted by the voltage at resistor 22a as described herein.

Reference op-amp 40 includes a first/positive power input (V+) 44 and a second/negative power input (V−) 45. The first power input 44 is electrically connected to the output of a first transistor 47, and the second power input 45 is electrically connected to the output a second transistor 49. In this example, the first transistor and the second transistor are bipolar junction transistors (BJT), each having a base that functions as a control for the transistor, a collector that functions as an input for the transistor, and an emitter that functions as an output for the transistor. Accordingly, the first power input 44 of op-amp 40 is electrically connected to the emitter 50 of first transistor 47, and the second power input 45 of op-amp 40 is electrically connected to the emitter 51 of second transistor 49. Transistors other than BJT-type transistors may be used such as, but not limited to, field effect transistors (FET), each having a gate, a source, and a drain, which have functions that correspond substantially to those of the base, the collector, and the emitter, respectively.

In this example, first transistor 47 is an NPN (Negative-Positive-Negative) transistor and second transistor 49 is a PNP (Positive-Negative-Positive) transistor. An NPN transistor turns on when the current flows in the positive direction (from base to emitter) through the base of the transistor. In this type of transistor, the current flows from the collector to the emitter. A PNP transistor turns on, when the current flows in the negative direction (from emitter to base) through the base of the transistor. In this transistor, the current flows from the emitter to the collector. Accordingly, a PNP transistor may turn on in response to a low signal such as ground, whereas an NPN transistor may turn on in response to a high signal.

Circuitry 20 includes a first current source 55 electrically connected between the base 57 and collector 58 of first transistor 47 and also electrically connected to a voltage source 60, which may be comprised of a settable voltage 60a and a predefined voltage 60b in some implementations, and a second current source 56 electrically connected between the base 62 and collector 63 of second transistor 49 and also electrically connected to a voltage source 65, which may be a predefined voltage in some implementations. The first current source 55 and the second current source 56 may be identical in structure and function and, therefore, may produce the same magnitude of current flowing in the same direction, which currents are labeled I1 and I2, respectively, in FIGS. 2 and 3.

A first Zener diode 70 has its cathode electrically connected to first current source 55 and to base 57 of transistor 47 and its anode electrically connected to an output 51 of op-amp 40 via an optional resistor 73. A second Zener diode 72 has its anode electrically connected to second current source 56 and to base 62 of transistor 49 and its cathode electrically connected to the output 41 of op-amp 40 (via the optional resistor) and to the anode of first Zener diode 70.

The first Zener diode 70 and the second Zener diode 72 may (or may not) be identical in structure and function.

In operation, first current source 55 outputs current that produces a voltage to bias first Zener diode 70 to provide a voltage on the base 57 of transistor 47, where this voltage provided on the base 57 of transistor 47 is based on, and tracks, the output voltage 41 of reference op-amp 40 by virtue of the output voltage 41 being electrically connected to the anode of Zener diode 70; and second current source 56 biases second Zener diode 72 to provide a voltage on the base 62 of transistor 49, where this voltage provided on the base 62 of transistor 49 is based on, and tracks, the output voltage 41 of reference op-amp 40 by virtue of the output voltage 41 being electrically connected to the cathode of Zener diode 72. In this example, the first power input (V+) 44 of reference op-amp 40 has a voltage that is the voltage across Zener diode 70 at base 57 minus $V_{BE}$ of transistor 47, where $V_{BE}$ is the voltage difference between the voltages at the base and emitter of transistor 47. In this particular example $V_{BE}$ is 0.7V; however, different transistors may have different $V_{BE}$ values. In this example, the second power input (V−) 45 of reference op-amp 40 has a voltage that is the voltage across Zener diode 72 at base 62 minus $V_{BE}$ of transistor 49. In this particular example $V_{BE}$ is 0.7V; however, different transistors may have different $V_{BE}$ values. Precision shunt voltage regulators or shunt voltage references or other functionally equivalent adjustable and non-adjustable devices can be substituted for the Zener diodes 70 and 72.

Because the voltages at power input 44 (V+) and power input 45 (V−) are based on the output voltage 41 of op-amp 40, the difference in the two voltages will be the same for different values of REF(IN) so long as the example input voltages from voltage sources 60 and 65 do not change. In this example, those input voltages are −15V and +15V or HVCC 60a, which is settable by the control system up to any predefined value, such as between 0V and +200V in this example. Stated differently, in some implementations, the power input (V+) 44 and power input 45 (V−) 45 voltages may change in value but will still have a predefined difference that does not change outside of a predefined acceptable tolerance for different values of REF(IN). In this example, the power input 44 (V+) and power input 45 (V−) may have voltages in a range between input voltage 65 (e.g., −15V) and HVCC (e.g., +200V). The values of ±15V and +200V are examples only, and those voltages may have different values than these including, but not limited to, different magnitudes and/or different polarities.

In example circuitry 20, the voltage at power input 45 (V−) is REF(IN)−5V and the voltage at power input (V+) 44 is REF(IN)+35V. In this example, −5V and +35V were selected due to availability of high precision operational amplifier commercially available that fit the description of low offset voltage and low drift as described previously. In other implementations, the voltages at power input 45 (V−) and power input 44 (V+) may differ from REF(IN) by more or less than 5V and/or by more or less than 35V. The differences may depend on the operational parameters of reference op-amp 40, the input voltage at REF(IN), and the circuit elements included in the circuitry associated with reference op-amp 40.

In some implementations, when more than +200V is applied at HVCC, Zener diode 70 reverse bias and causes circuitry 20 to stop operating. Application of HVCC may be controlled by the control system of the test system.

The voltages at power input 44 (V+) and power input 45 (V−) are applied to the positive and negative power inputs, respectively, of each output op-amp 24—for example, to positive power input 35 and negative power input 36 of op-amp 24g. Each op-amp 24 is thus powered using relatively low voltages and a relatively low voltage differential, thereby enabling the precision of each op-amp described previously.

As noted, circuitry 20 also includes switches 26, which are controllable to output a voltage or voltage difference to the DUT. Each such switch 26 may include one or more transistors or other circuits; and each such switch may have the same structure and function in some implementations. In some implementations, different ones of the switches may have different structures than those shown.

Referring to FIG. 3, an example switch 26a along example parallel circuit 32a includes transistors 77, 78, and 79. Transistor 77 acts as a shunt over resistor 80, which when gated, bypasses resistor 80. Resistor 80 may have any appropriate value, not just the 50 KΩ shown. The configuration of switch 26a, through control over transistors 77, 78, and 79, enables a voltage difference or the same voltage to be applied to one or more corresponding outputs 30a from parallel circuit 32a, Transistors 77, 78, and 79 may be controlled by a control system of the test system by applying voltages to their respective gates. Transistors 77, 78 and 79 can be, but are not limited to, a discrete solid state or mechanical relay design or commercially available integrated solid state photo MOS (metal oxide semiconductor) or mechanical relay design.

Figure 4:
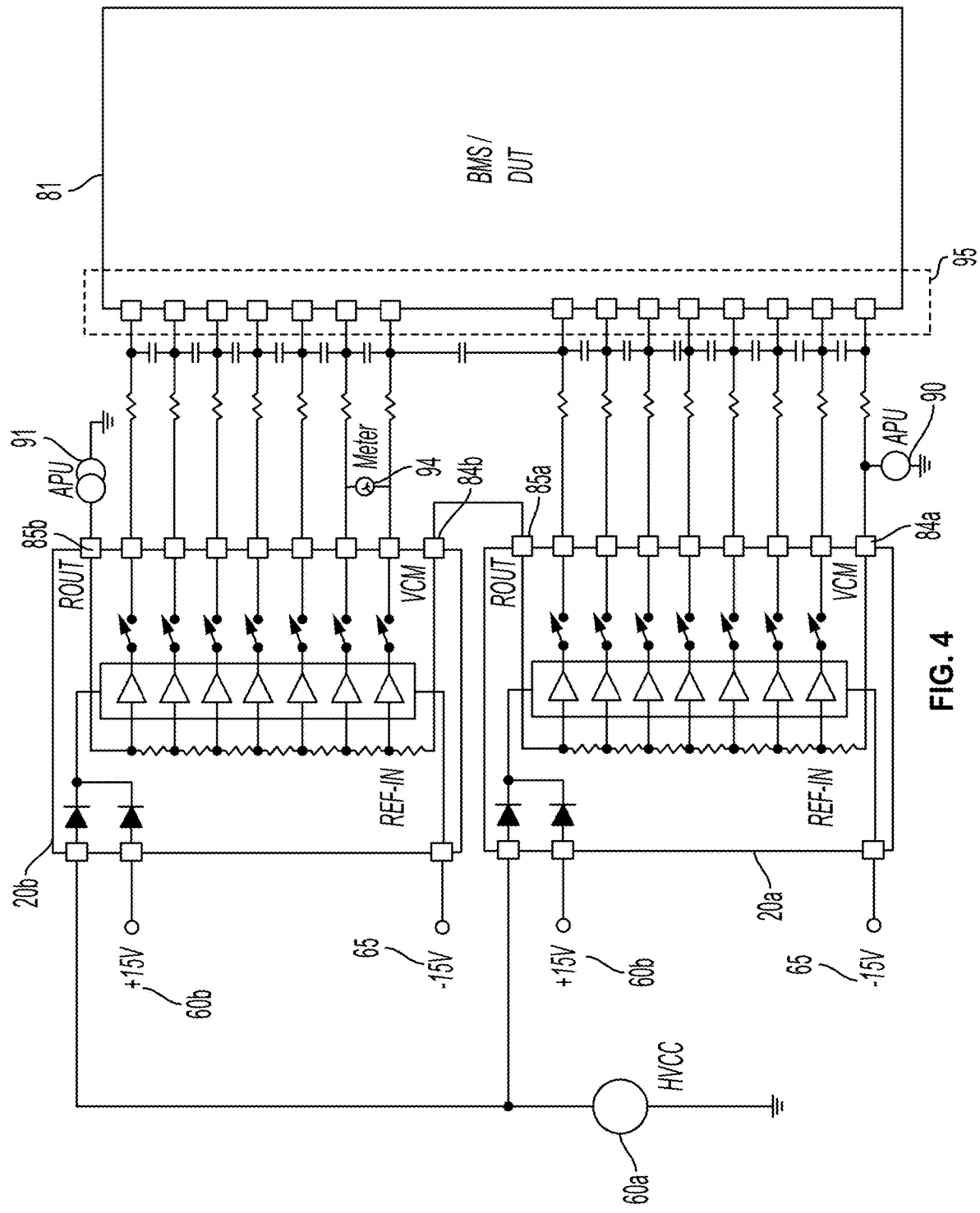
FIG. 4 is a diagram showing example instances of the circuitry of FIGS. 2 and 3 connected serially to test a DUT.

Referring to FIG. 4, multiple instances 20a, 20b of circuitry 20 like that shown in FIGS. 2 and 3, each of which is configured to function as floating power supply module, may be electrically connected in series to test a single DUT such as BMS 81 or to test multiple DUTs (not shown). The multiple instances 20, 20b of circuitry 20 in FIG. 4 may be identical in structure and function to circuitry 20 of FIGS. 2 and 3 (not all components of circuitry 20 are shown in FIG. 4).

In the example of FIG. 4, low voltage end 84a of circuitry 20a is electrically connected to a first reference voltage 90, which may be a programmable test system analog pin unit (APU) or test system voltage/current source commonly referred to as a (VI) connected electrically to ground. High voltage end 85a of circuitry 20a is electrically connected to low voltage end 84b of circuitry 20b. High voltage end 85b of circuitry 20b is electrically connected to a second reference voltage 91, which may be an APU connected electrically to ground. In this example, second reference voltage 91 provides a voltage reference that is greater in magnitude than that of first reference voltage 90.

In FIG. 4 example, if a current is provide by APU 91, the voltage on each resistor is multiplied by the current at 91. If all the resistors are equal (which is not a requirement), the voltage across each resistor is equal. The serial connection of multiple instances 20a, 20b of circuitry 20 in FIG. 4 produces progressive voltage steps for corresponding parallel circuits. For example, if each voltage step applied by a resistor in the resistor ladder is 5V, then 35V (relative to low voltage end 84a) is applied to the low voltage end 84b of circuitry 20b, causing the resistor ladder in circuitry 20b to apply an additional 5V at each successive resistor for a total of 70V at high voltage end 85b in this example. Voltages such as these may be necessary in some examples to test stacked batteries and, therefore, to test a BMS 81 that controls multiple (e.g., fourteen or more) stacked batteries or cells. However, because the power inputs to the output op-amps are controlled using a reference op-amp such as op-amp 40 of FIGS. 2 and 3, high voltages such as 70V are not needed on power inputs to the output (isolating) op-amps 24, thereby enabling use of output op-amps 24 that maintain outputs having the relatively high levels of precision described herein.

Although FIG. 4 shows two instances of circuitry 20 connected in series, any number of instances of circuitry 20 may be connected in series; for example, three instances of circuitry 20 may be connected in series, four instances of circuitry 20 may be connected in series, five instances of circuitry 20 may be connected in series, and so forth.

As shown in FIG. 4, a meter 94 may be used during testing to determine the voltage difference between adjacent DUT inputs 95, prior to testing. This information may be used in setting the voltage levels of the test signals to be output from circuitry 20$a$, 20$b$. When testing begins, the meter may be disconnected since it may affect the impedance of the resistor ladder among other circuits, which can adversely affect the test signals.

Figure 6:
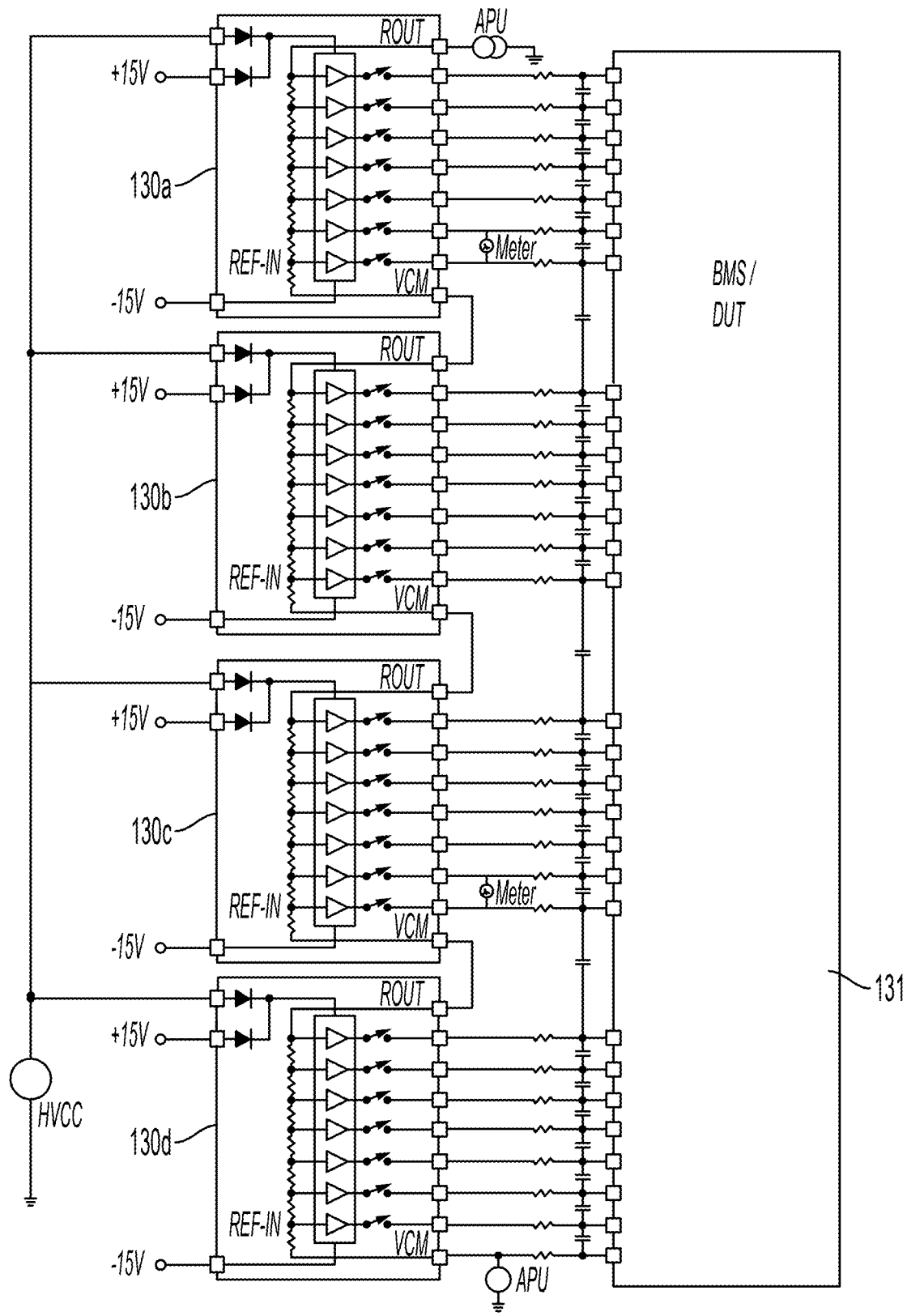
FIG. 6 is a block diagram showing four example instances of the circuitry of FIGS. 2 and 3 connected serially to test a DUT.

Referring to FIG. 6, multiple instances 130$a$, 130$b$, 130$c$, and 130$d$ of circuitry like circuitry 20 of FIGS. 2 and 3, each of which is configured to function as floating power supply module, may be electrically connected in series to test a single DUT such as BMS 131 or to test multiple DUTs (not shown).

Figure 5:
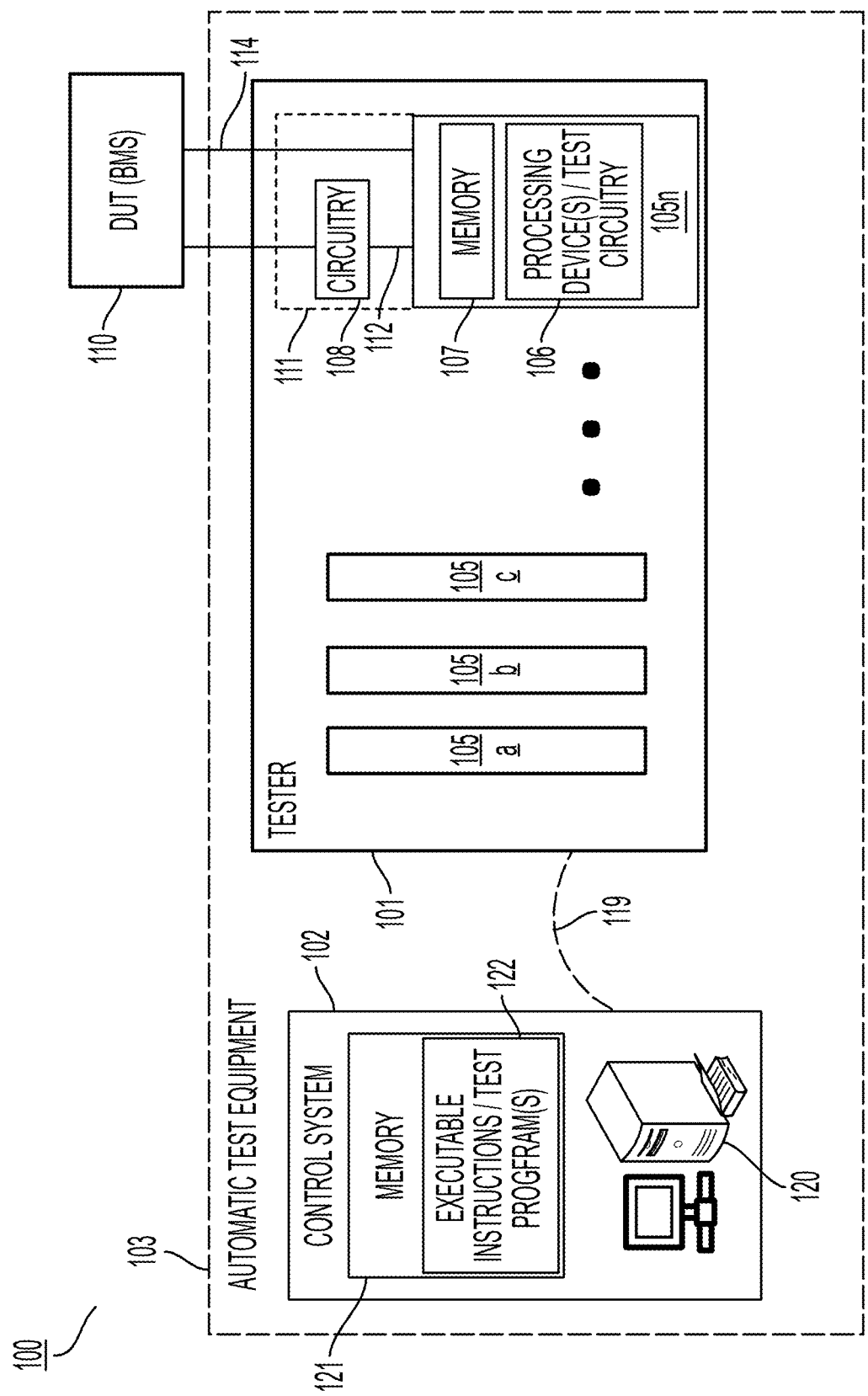
FIG. 5 is a block diagram showing example components of a test system that includes examples of the circuitry of FIGS. 2, 3 and/or 4.

FIG. 5 is a block diagram showing components 100 of an example implementation of test setup 10 of FIG. 1, which includes a testing device/apparatus (referred to also as a "tester") 101 and a control system 102. Tester 101 and control system 102 may be, or may be a part of, automatic test equipment (ATE) 103.

ATE 103 includes one or more (e.g., multiple) test instruments 105$a$ to 105$n$ (where n>3), each of which may be configured, as appropriate, to implement testing and/or other functions. Although only four test instruments are shown, ATE 103 may include any appropriate number of test instruments.

The test instruments may be, or include, hardware devices and each test instrument may be configured like test instrument 105$n$ to include one or more processing devices/test circuitry 106, memory 107 storing instructions that are executable by the one or more processing devices/test circuitry 106 to generate test signals to send to a DUT such as DUT (BMS) 110, and/or one or more instances 108 of circuitry 20 like that described with respect to FIGS. 2, 3 and/or 4. In some implementations, each instance 108 of circuitry 20 is outside of a test instrument and receives test signals from one or more of the test instruments. Dashed line 111 indicates that each instance 108 of circuitry 20 can be inside or outside a test instrument.

Each test instrument may be configured—for example, programmed—to output test signals (e.g., voltages at the high and low ends) via signal pathway 112 to an instance of circuitry 20, which then provides those test signals to test one or more DUTs such as BMS 110. In some examples, the test signals are designed to elicit response(s) from the DUT. The test instruments or control system 102 may receive the response(s) via signal pathway 114, for example. The test instruments or control system may analyze the response(s) to determine whether the DUT passed or failed testing. Each instrument may be configured—for example, programmed—to provide the diagnostic signals 21, including REF(IN) also described above.

In some implementations, the test signals to test a DUT may be generated by test program(s) executing on a test instrument and/or control system 102. In an example, a test program may be or include a set of instructions that are executed or interpreted by ATE 103 to produce test signals that the ATE uses to test the DUT.

Control system 102 is configured—e.g., programmed—to communicate with test instruments 105$a$ to 105$n$ to direct and/or to control testing of the DUTs and to control operations of one or more instances 108 of circuitry 20 in the manner described herein. In some implementations, this communication 119 may be over a computer network or via a direct connection such as a computer bus or an optical medium. In some implementations, the computer network may be or include a local area network (LAN) or a wide area network (WAN). The control system may be or include a computing system comprised of one or more processing devices 120 (e.g., microprocessor(s)) and memory 121 for storing instructions 122 to execute to control operation of the ATE including circuitry 20 and/or testing, and/or one or more test programs to execute and/or to send to the test instruments for execution. Control system 102 may be configured to provide test programs and/or test signals to test instruments 105$a$ to 105$n$, which the test instrument(s) use to test the DUT. Control system 102 may also be configured to receive DUT response signals (e.g., measurement data) from the test instrument(s) and to determine whether the corresponding DUT has passed or failed testing.

In some implementations, the control functionality is centralized in processing device(s) 120. In some implementations, all or part of the functionality attributed to control system 120 may also or instead be implemented on a test instrument and/or all or part of the functionality attributed to one or more test instruments may also or instead be implemented on control system 120. For example, the control system may be distributed across processing device(s) 120 and one or more of test instruments 105$a$ to 105$n$.

All or part of the test systems and processes described in this specification and their various modifications may be configured or controlled at least in part by one or more computers such as control system 102 using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with configuring or controlling the test system and processes described herein can be performed by one or more programmable processors executing one or more computer programs to control or to perform all or some of the operations described herein. All or part of the test systems and processes can be configured or controlled by special purpose logic circuitry, such as, an FPGA (field programmable gate array) and/or an ASIC (application-specific integrated circuit) or embedded microprocessor(s) localized to the instrument hardware.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

In the description and claims provided herein, the adjectives "first", "second", "third", and the like do not designate priority or order unless context dictates otherwise. Instead, these adjectives may be used solely to differentiate the nouns that they modify.

Any mechanical or electrical connection herein may include a direct physical connection or an indirect physical connection that includes one or more intervening components. An electrical connection may be wired and/or wireless.

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. Circuitry for use in testing a device under test (DUT), the circuitry comprising:
   test input terminals;
   a resistor ladder comprising resistors electrically connected in series, the resistor ladder being electrically connected to each of the test input terminals;
   first operational amplifiers, each first operational amplifier comprising a first input terminal and a first output terminal, each first input terminal being electrically connected to the resistor ladder, and each first output terminal to electrically connect to the DUT; and
   floating circuitry comprising:
      a second operational amplifier comprising:
         a second input terminal electrically connected to the resistor ladder and electrically connected to a reference input terminal of the test input terminals, the reference input terminal being electrically connected to a voltage source;
         a first power supply input terminal to receive a first voltage; and
         a second power supply input terminal to receive a second voltage;
         wherein the first voltage and the second voltage are based on a voltage on the reference input terminal;
      wherein the floating circuitry is configured to apply the first voltage and the second voltage to respective power input terminals of each of the first operational amplifiers.

2. The circuitry of claim 1, wherein the second operational amplifier has a drift that is in a range of one microvolt (1 µV) or less.

3. The circuitry of claim 1, wherein the second operational amplifier has an offset that is in a range of ten microvolts (10 µV) or less.

4. The circuitry of claim 1, wherein the first voltage and the second voltage differ by a predefined amount irrespective of changes to the voltage on the reference input terminal.

5. The circuitry of claim 1, wherein the first voltage and the second voltage track the voltage on the reference input terminal.

6. The circuitry of claim 1, wherein the second operational amplifier comprises a second output terminal, the second input terminal having a greater impedance than the second output terminal to at least partly electrically isolate the resistor ladder from the DUT.

7. The circuitry of claim 1, wherein the floating circuitry comprises:
   a first transistor comprising a first transistor output terminal electrically connected to the first power supply input terminal; and
   a second transistor comprising a second transistor output terminal electrically connected to the second power supply input terminal;
   wherein the first voltage comprises a voltage at the first transistor output terminal and the second voltage comprises a voltage at the second transistor output terminal.

8. The circuitry of claim 7, wherein the first transistor comprise a first transistor input terminal and a first transistor control terminal, and the second transistor comprises a second transistor input terminal and a second transistor control terminal; and
   wherein the floating circuitry comprises:
      a first current source and a first Zener diode, the first Zener diode comprising a first cathode electrically connected to the first transistor control terminal and a first anode electrically connected to the second output terminal of the second operational amplifier, the first current source being electrically connected between the first transistor input terminal and the first transistor control terminal of the first transistor to provide current to bias the first Zener diode; and
      a second current source and a second Zener diode, the second Zener diode comprising a second anode electrically connected to the second transistor control terminal and a second cathode electrically connected to the second output of the second operational amplifier and to the first anode, the second current source being electrically connected between the second transistor input terminal and the second transistor control terminal of the second transistor to provide current to bias the second Zener diode.

9. The circuitry of claim 8, wherein the first transistor comprises a bipolar junction transistor having an NPN (Negative-Positive-Negative) configuration, and the second transistor comprises a bipolar junction transistor having a PNP (Positive-Negative-Positive) configuration.

10. The circuitry of claim 8, further comprising:
    a voltage line connected to the first current source and controllable to apply voltage from the voltage source in excess of 200V to the first current source.

11. The circuitry of claim 1,
    wherein the resistor ladder is connected between the first operational amplifiers and the test input terminals such that a same resistor is electrically connected to each test input terminal in a pair of adjacent test input terminals and to each first operational amplifier in a corresponding pair of adjacent first operational amplifiers.

12. The circuitry of claim 1, further comprising:
    parallel circuits, each parallel circuit comprising one of the first operational amplifiers;
    wherein the resistor ladder is electrically connected to each of the parallel circuits.

13. The circuitry of claim 1, wherein the voltage on the reference input terminal is controllable to change; and
    wherein the first voltage and the second voltage continue to differ by the predefined amount following the change.

14. The circuitry of claim 1, further comprising:
    a switch circuit at each first output terminal of each first operational amplifier, the switch circuit being controllable to apply a voltage from a corresponding first operational amplifier to a pin on the DUT.

15. The circuitry of claim 1, wherein the DUT comprises a battery management system.

16. A testing system comprising:
    floating power supply modules connected in series, each of the floating power supply modules also being configured to connect to a device under test (DUT);
    wherein each floating power supply module comprises:
        test input terminals;
        a resistor ladder comprising resistors electrically connected in series, the resistor ladder being electrically connected to each of the test input terminals;
        first operational amplifiers, each first operational amplifier comprising a first input terminal and a first output terminal, each first input terminal being electrically connected to the resistor ladder, and each first output terminal to electrically connect to the DUT; and
        a floating circuit configured to at least partly electrically isolate the resistor ladder, the floating circuit comprising:
            a second operational amplifier comprising:
                a second input terminal electrically connected to the resistor ladder and to a reference input terminal of the test input terminals, the reference input terminal being electrically connected to a voltage source;
                a first power supply input terminal to receive a first voltage; and
                a second power supply input terminal to receive a second voltage;
        wherein the first voltage and the second voltage are based on a voltage on the reference input terminal;
        wherein the floating circuit is configured to apply the first voltage and the second voltage to respective power supply input terminals of each of the first operational amplifiers.

17. The testing system of claim 16, wherein the floating power supply modules comprise a first floating power supply module comprising a first resistor ladder and a second floating power supply module comprising a second resistor ladder;
    wherein each of the first resistor ladder and the second resistor ladder comprises a high voltage end corresponding to a first test input terminal and a low voltage end corresponding to a second test input terminal, with the high voltage end being at a greater voltage than the low voltage end; and
    wherein the high voltage end of the first resistor ladder is electrically connected to the low voltage end of the second resistor ladder.

18. The testing system of claim 16, wherein, in each floating power supply module, the floating circuit is configured to at least partly electrically isolate the resistor ladder from the DUT.

19. The testing system of claim 16, wherein each floating power supply module comprises circuit elements electrically connected to the second operational amplifier to produce the first voltage and the second voltage.

20. The testing system of claim 16, wherein each floating power supply comprises means for producing the first voltage and the second voltage.

21. The testing system of claim 16, wherein the floating power supply modules comprise a first floating power supply module comprising a first resistor ladder and multiple second floating power supply modules each comprising a respective second resistor ladder;
    wherein each of the first resistor ladder and each second resistor ladder comprises a high voltage end corresponding to a first test input terminal and a low voltage end corresponding to a second test input terminal, with the high voltage end being at a greater voltage than the low voltage end; and
    wherein the high voltage end of the first resistor ladder is electrically connected to the low voltage end of a second resistor ladder and, for each additional second resistor ladder, a low high end thereof is electrically connected to a low voltage end of a next second resistor ladder in sequence.

\* \* \* \* \*